United States Patent [19]
Grundman

[11] 3,710,905
[45] Jan. 16, 1973

[54] TORQUE TRANSMITTING DEVICE

[75] Inventor: Roger V. Grundman, Roseville, Minn.

[73] Assignee: Minnesota Mining and Manufacturing Company, St. Paul, Minn.

[22] Filed: Aug. 13, 1970

[21] Appl. No.: 63,629

Related U.S. Application Data

[62] Division of Ser. No. 805,422, March 10, 1969, Pat. No. 3,617,426.

[52] U.S. Cl.............192/46, 188/82.77, 188/251 A, 192/107 M
[51] Int. Cl......F16d 41/00, F16d 13/64, F16d 63/00
[58] Field of Search......................192/46, 107M; 188/82.77, 251A, 250 G, 188/250 G

[56] References Cited

UNITED STATES PATENTS

| 3,143,895 | 8/1964 | Robie | 192/107 M X |
| 3,386,122 | 6/1968 | Mathison | 192/46 X |

*Primary Examiner*—Allan D. Herrmann
*Attorney*—Kinney, Alexander, Sell, Steldt and Delahunt

[57] ABSTRACT

A torque transmitting device in which short stiff normally straight fibers extend from facing planar surfaces of a pair of supported members in a circular pattern around a common axis and intermesh to permit torque transmission from one member to the other.

7 Claims, 5 Drawing Figures

PATENTED JAN 16 1973  3,710,905

TORQUE TRANSMITTING DEVICE

CROSS-REFERENCE TO RELATED APPLICATION

This application is a division of application Ser. No. 805,422, filed on Mar. 10, 1969 now U.S. Pat. No. 3,617,426.

This invention relates to an improved torque transmitting device in which short stiff normally straight fibers extending from facing planar surfaces of a pair of members intermesh to permit torque to be transmitted between the members through the fibers.

Torque transmission devices of the prior art have generally been formed with contacting friction surfaces one of which is metal and precision ground for alignment with the other surface. More recently it has been discovered that torque may be transmitted between two surfaces through fibers which extend from the surfaces and intermesh. Such devices eliminate the need for precision alignment of the parts. Thus, in U.S. Pat. Nos. 2,424,873 and 2,941,410 there are illustrated devices in which torque may be transmitted from a driving member to a driven member through normally straight intermeshing fibers. In each of these devices, however, the fibers extend from at least one of the members perpendicular to its axis of rotation and a major portion of the fibers are, at any time, disengaged and unavailable for transmitting torque. Since the amount of torque which may be transmitted is dependent on the number of fibers which are intermeshed at any one time, the efficiency of these devices is undesirably limited. More efficient utilization of fibers has been made by the use of driving and driven members having facing planar surfaces perpendicular to their axis of rotation where the fibers extend from the facing surfaces and intermesh. However, until now, to prevent the fibers from brushing past one another which would permit undesired relative rotation of the driving and driven members, it was necessary that the fibers be nearly absolutely rigid or that they interlock as the "hook" and "pile" fabric of U.S. Pat. No. 3,143,895. Therefore, the types of fibers which could be used were unduly limited or the fibers were required to be specially formed in a fabric. Furthermore, in all of the aforementioned devices the fibers remain intermeshed when the driving and driven members are rotated in either direction about their axes and, therefore, they may not be used in a unidirectional drive such as that required in a starter clutch of an internal combustion engine.

It is therefore an object of the present invention to provide a torque transmitting device in which normally straight fibers are efficiently utilized to transfer torque between facing torque transmission surfaces. It is a further object to provide a unidirectional torque transmission device in which normally straight fibers intermesh only when the members are rotated in one direction.

The novel features and advantages of the present invention will become apparent after reading the following description which refers to the accompanying drawing wherein.

Figure 1:
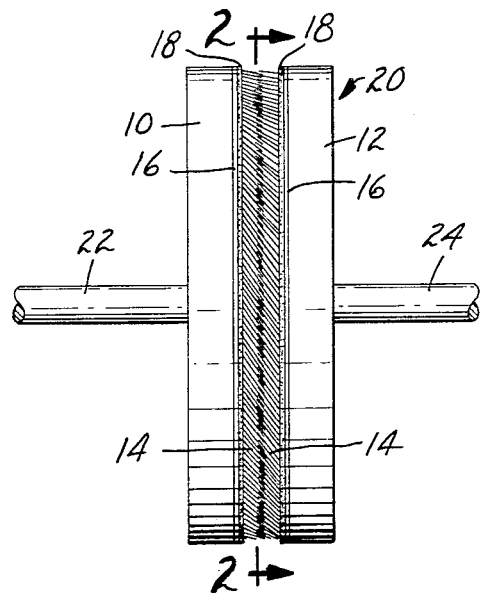
FIG. 1 is a longitudinal view of a torque transmitting device made in accordance with the present invention used as a clutch.
Figure 2:
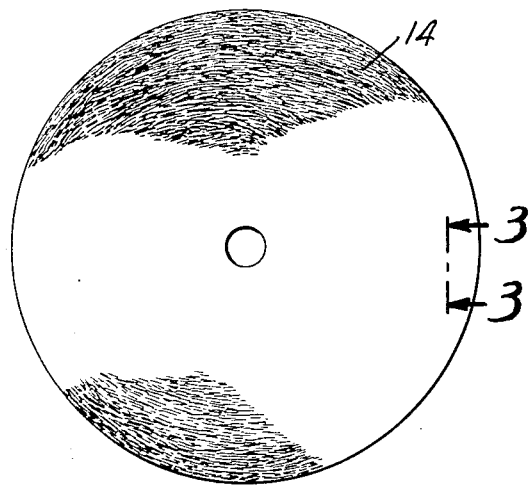
FIG. 2 is a plan view taken along line 2—2 of FIG. 1.

The torque transmitting device of the present invention comprises a pair of supported members 10 and 12 having facing parallel planar surfaces and a plurality of stiff normally straight short fibers 14.

The supported members 10 and 12 are preferably disk shaped and are similarly formed of a rigid material such as a metal or a rigid plastic with a flexible fabric backing 16 such as an open web cotton fabric supporting the fibers which are bonded thereto, and the backings are secured to and covering the facing planar surfaces of the support members. These members 10 and 12 are supported coaxially with their facing planar surfaces normally spaced such that their common axis is centrally perpendicular to their facing planar surfaces.

The fibers 14 may be manufactured of synthetic, semi-synthetic, regenerated or natural fibers. It is preferred to use nylon of about 10–500 denier per filament and a length of about 1–10 mm. In a single embodiment fibers of similar denier and length are randomly spaced on opposed portions of the facing planar surfaces of the supported members 10 and 12. Each fiber 14 has one end secured to one of the facing planar surfaces of supported members 10 and 12 preferably by being embedded in an adhesive layer 18 which covers the exposed face of the flexible fabric backing 16. As is diagrammatically illustrated in FIG. 4, each fiber 14 is secured to extend from a planar surface at an acute angle of less than 45° and perpendicular to a straight line on the planar surface intersecting the secured end of the fiber 14 and the common axis of the supported members 10 and 12. Thus, in the illustrated embodiments the fibers 14 extend from the planar surfaces each perpendicular to a radius of the disk shaped supported member 10 or 12 to which it is secured.

Figure 4:
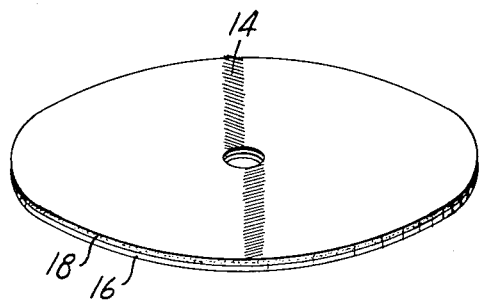
FIG. 4 is a perspective view of the surface of FIG. 2 with a majority of the fibers removed to illustrate the general arrangement of the fibers.
Figure 3:
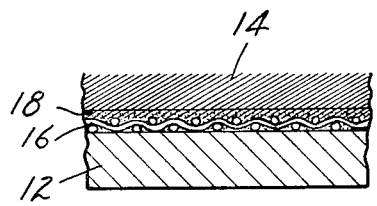
FIG. 3 is an enlarged transverse sectional view taken along line 3—3 of FIG. 2.
Figure 5:
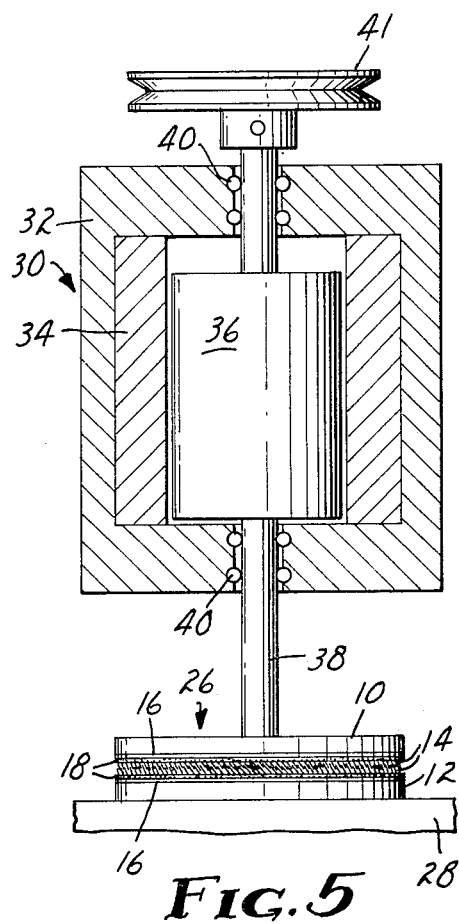
FIG. 5 is a transverse view partially in section of the present invention used as a motor brake.

Preferably all of the fibers 14 secured to one of the planar surfaces extend therefrom in a single circular direction about the common axis of the associated supported member 10 or 12, as illustrated in FIG. 4, and the fibers on opposed planar surfaces extend in opposite circular directions as illustrated in FIGS. 1 and 5. Thus, when the supported members 10 and 12 are positioned as illustrated in FIGS. 1 and 5 and one of the members is driven in the same circular direction as the fibers extend from its planar surface the fibers intermesh with the fibers extending from the opposed surface. Because the fibers extend from the facing planar surfaces at an acute angle less than 45°, this rotation of one of the members causes the fibers extending from one surface to be driven toward the secured ends of the fibers extending from the other surface and the supported members 10 and 12 are drawn closer together by a self-energizing effect. The free ends of the fibers 14 extending from each of the opposed planar surfaces are then trapped between the other opposed planar surface and the secured ends of the fibers extending from the other opposed planar surface, thereby increasing the effect of the coupling and the torque transmitting capacity. In accordance with the present invention, where bidirectional torque transmission may be desirable, the fibers on each of the planar surfaces may also extend therefrom in both circular directions about the common axis of the supported members 10 and 12 so long as the fibers on opposed concentric portions of the facing planar surfaces extend in opposite circular directions. Thus, by positioning the fibers in concentric circular strips about the common axis, with the fibers in adjacent strips on each member extending in opposite circular directions and with the fibers on opposed concentric portions of the surfaces also extending in opposite circular directions, portions of the fibers extending from the surfaces will intermesh in each direction of rotation.

Referring now to FIG. 1, there is illustrated a unidirectional clutch, generally designated 20, utilizing the present invention. The disk shaped members 10 and 12 are respectively supported on rotatably supported shafts 22 and 24 which extend oppositely perpendicular from the non-facing surfaces and coaxially with the common axis of the members 10 and 12. As aforementioned the fibers extend from each of the planar surfaces in a single circular direction. Upon driving one of the members 10 through its shaft 22 or 24 in the same circular direction as the fibers extend from its planar surface the fibers extending from the facing surfaces intermesh as aforedescribed to drive the other member in the same circular direction. However, when the driving member 10 is rotated in a circular direction opposite that in which the fibers extend from its planar surface the fibers extending from the opposed surfaces are disengaged, and likewise if the driven member 12 moves in the same circular direction faster than the driving member the fibers become disengaged, thereby permitting relative rotation of the members 10 and 12. This device may, therefore, be used as a starter clutch in an internal combustion engine as, for instance, the type used on lawn mowers. Although the fibers are disengaged upon the aforementioned relative rotation of the members there will be frictional contact of the fibers which may cause deterioration of the fibers especially at high relative rotational velocities. It is therefore preferable that means be provided for moving one of the members 10 or 12 axially away from the other member, upon relative rotation of the members, a distance sufficient to prevent contact of the fibers.

REferring now to FIG. 5 there is illustrated a unidirectional motor brake, generally designated 26, illustrating a second use of the present invention. One of the disk shaped members 12 has its fiber free planar surface secured to a fixed surface 28, and the other or upper disk shaped member 10 is secured by its fiber free planar surface to one end of a drive shaft 38 of an electric motor 30 coaxially with the shaft 38. The electric motor has a housing 32, a stator 34, a rotor 36 having a lesser length than the stator 34, and a drive shaft 38 coaxially supporting the rotor 36. The drive shaft 38 is supported at the ends of the housing 32 by bearings 40 which permit free rotation and axial movement of the drive shaft 38, the rotor 36 and the member 10 with respect to the housing. The housing 32 is supported in spaced relationship to the surface 28 such that the drive shaft 38 and the disk shaped member 10 secured thereto are coaxial with the fixed disk shaped member 12 and the fibers 14 extending from the planar surfaces of members 10 and 12 are in contact when the motor is not operating. A gear or pulley 41 which may drive a chain or belt (not shown) to transfer torque upon energization of the motor 30 is secured to the drive shaft 38 on the end opposite the member 10. In this device the fibers 14 on the member 10 secured to the drive shaft 38 are positioned to extend therefrom in the same circular direction as the rotor 36 turns upon energization of the motor 30 or counterclockwise as viewed from above the motor in FIG. 5. The fibers on the fixed member 12 are then positioned to extend therefrom in the opposite circular direction or clockwise. Upon energization of the motor 30 the magnetic field set up on the stator 34 immediately pulls the rotor away from the member 12 to center the rotor in the stator thereby moving the driving shaft 38 and the member 10 secured thereto axially to separate the fibers 14 extending from the planar surfaces. The rotor 36, the drive shaft 38, the pulley 41 and the upper member 10 then rotate counterclockwise so long as the motor 30 is energized. Upon de-energization of the motor, the magnetic field in the stator is curtailed but the rotor, being freely rotatable, continues to rotate. Curtailment of the magnetic field in the stator 34, however, permits the rotor 36 to almost immediately move toward its normal position engaging the fibers on member 10 with the fibers on member 12. The fibers 14 extending from member 10 intermesh with the fibers 14 extending from the fixed member 12 as aforedescribed to immediately brake the continued rotation of the rotor 36 in the driven direction.

Where a load is being moved by the motor 30 it is often advantageous to brake the motor against reverse rotation when the motor is de-energized. This would prevent the load from dropping whenever the motor is de-energized. In such an application of fibers on the member 10 would extend in the opposite direction to the direction of rotation of the rotor and the fibers on the stationary member would extend counterclockwise from its face.

In a preferred embodiment of the present invention a substantial portion of the individual fibers extend from the surface at an angle of between 15 and 45 degrees and the fibers are nylon, 0.150 inch long and 50 denier, and coated on said surface at a density of about 8,000 fibers per square inch (1,250 fibers per square centimeter).

Having thus described the present invention, what is claimed is:

1. A torque transmitting device comprising:
a pair of supported members having parallel spaced facing generally planar surfaces, at least one of said members being supported for rotation about an axis generally centrally perpendicular to said planar surfaces, and
a plurality of short stiff normally straight fibers randomly spaced on opposed portions of said planar surface, each said fiber having one end secured to one of said planar surfaces and extending therefrom at an acute angle less than about 45° and generally perpendicular to a straight line on said surface intersecting said secured end of said axis, said fibers extending from opposed portions of said planar surfaces in opposite circular directions about said axis a distance sufficient to position the free end of each said fiber nearer the opposed planar surface than the surface from which it extends, whereby said fibers extending from opposed portions of said facing planar surfaces intermesh and torque may be trans-mitted from said rotatable member to said other member through said fibers.

2. A torque transmitting device as recited in claim 1 wherein said fibers on said planar surface of said rotatable member extend therefrom in a single circular direction about said axis and said fibers on the other planar surface extend therefrom in the opposite circular direction about said axis.

3. A torque transmitting device ad recited in claim 1 including means for moving at least one of said pair of members away from the other of said members along said axis a distance sufficient to disengage said fibers extending from said planar surfaces.

4. A unidirectional clutch comprising:
a pair of members having parallel spaced facing generally planar surfaces, said members being independently supported for rotation about a common axis generally centrally perpendicular to said planar surfaces, and
a plurality of short stiff normally straight fibers randomly spaced on opposed portions of said planar surfaces, each said fiber having one end secured to one of said planar surfaces and extending therefrom at an acute angle less than about 45° generally perpendicular to a straight line on said surface intersecting said secured end and said axis, said plurality of fibers extending from each of said surfaces in a single circular direction about said common axis and in opposite circular directions from said facing surfaces a distance sufficient to position the free end of each said fiber nearer the opposed planar surfaces than said planar surface from which it extends,
whereby said fibers extending from said facing surfaces intermesh when one of said members is rotated about said axis in the circular direction said fibers thereon extend to drive the other of said members and rotation of said one member in the opposite direction prevents intermeshing of said fibers thereby permitting relative rotation of said members.

5. A unidirectional clutch as recited in claim 4 including means for moving at least one of said pair of members away from the other of said members along said axis a distance sufficient to prevent engagement of said fibers extending from said planar surfaces when either of said members is rotated about said axis in the circular direction said fibers thereon extend.

6. A unidirectional rotational brake comprising:
a pair of supported members having parallel spaced facing generally planar surfaces, one of said members being supported for free rotation about and translation along an axis generally centrally perpendicular to said planar surfaces,
a plurality of short stiff normally straight fibers randomly spaced on opposed portions of said planar surfaces, each of said fibers having one end secured to one of said planar surfaces and extending therefrom at an acute angle less than about 45° generally perpendicular to a straight line on said surface intersecting said secured end and said axis, said plurality of fibers on each of said surfaces extending therefrom in a single circular direction about said extended axis and in opposite circular directions from said facing surfaces,
means for moving said freely rotatable member along said axis away from said other member a distance sufficient to prevent intermeshing of said fibers when said freely rotatable member is driven about its axis in the same circular direction as said fibers extend from its planar surface, and
means for moving said freely rotatable member along its axis toward said other member a distance sufficient to intermesh said fibers extending from said opposed surfaces when said freely rotatable member is not being driven in the same circular direction as said fibers extend from its planar surface,
whereby as said rotatable member is driven in the same circular direction as said fibers extend from its planar surface said planar surfaces are spaced a distance sufficient to prevent intermeshing of said fibers and when the driving of said freely rotatable member is discontinued said rotatable member moves toward said other member to intermesh said fibers, thereby to prevent further rotation of said rotatable member.

7. A torque transmitting device comprising:
a pair of supported members having parallel spaced facing generally planar surfaces, at least one of said members being supported for rotation about an axis generally centrally perpendicular to said planar surfaces,
a plurality of short stiff normally straight fibers randomly spaced on one of said planar surfaces, each said fiber having one end secured to said one of said planar surfaces and extending therefrom at an acute angle less than about 45° and generally perpendicular to a straight line on said surface intersecting said secured end and said axis, all said fibers in a single circular strip about said axis, extending in a single circular direction about said axis, and
a plurality of projections engageable by the free ends of said fibers extending from the other of said planar surfaces,
whereby torque may be transmitted between said members through the resistance of said fibers to deflection under compression loading.

* * * * *